April 7, 1970  E. L. CLINE  3,504,537
BRAKE TESTING APPARATUS
Filed Sept. 30, 1965  7 Sheets-Sheet 4

INVENTOR
Edwin L. Cline
BY
Bacon & Thomas
ATTORNEYS 3,504,537
BRAKE TESTING APPARATUS
Edwin L. Cline, Pasadena, Calif., assignor to Clayton Manufacturing Company, El Monte, Calif., a corporation of California
Filed Sept. 30, 1965, Ser. No. 491,529
Int. Cl. G01l 5/28
U.S. Cl. 73—126    12 Claims

ABSTRACT OF THE DISCLOSURE

A brake testing device for separately applying a driving torque to two wheels of a vehicle. The indicator means may include over-shoot and under-shoot preventing means.

---

This invention relates to brake testing apparatus, and more particularly to apparatus for simultaneously testing the brakes on the front wheels, or on the rear wheels, of a motor vehicle to analyse their action and effectiveness, and to determine any momentary or continuous unbalance in their brake force application.

When testing the performance of motor vehicle brakes, there are three principal areas that should be investigated, the first being mechanical action to determine whether or not the left side and right side brakes on the front, or on the rear, wheels of the vehicle engage simultaneously, or whether one brake lags behind the other due to abnormal friction of a brake shoe on its mounting plate, wheel cylinder drag, a broken return spring, etc. The second area of investigation is to determine whether any of the hydraulic lines which conduct operating fluid to the wheel brake cylinders contains a restriction, such as might result from a flattened tube, or foreign matter, in said lines, either of which causes a dangerous condition of momentary imbalance. Unbalance in brake action between the different wheels on a vehicle resulting either from faulty mechanical action or restrictions in the hydraulic lines can cause a vehicle to swerve dangerously when its brakes are applied quickly, as in making an emergency stop at high speed. Hence, the need for detection of these faults which may not be evident during braking at low speed.

The third area of brake performance that should be investigated when testing the brakes on a motor vehicle are the friction characteristics of the brake linings, both cold and heated. Each wheel on a vehicle is equipped with a brake assembly usually including a pair of shoes, each having a brake lining thereon, and a drum against which the brake lining is urged when the brake is applied. The power driving a wheel is absorbed by frictional engagement between the brake lining and drum, the driving power being transformed through the action of friction into heat energy that greatly increases the temperature of the brake lining in the matter of a few seconds. The frictional characteristics of a brake lining can vary greatly with changes in temperature, especially if the frictional surface of the brake lining is contaminated by brake fluid, grease, or other foreign substances, and such variations can be dangerous when brakes are applied even at normal city driving speeds, since they can cause the brakes on different wheels to act unevenly.

To effectively and reliably test brake performance in the above three areas, the tests must be conducted under conditions as nearly as possible like those encountered in normal city and highway driving, because the operating characteristics of a brake system will differ widely, depending upon the condition of the system and the vehicle speed at the time the brakes are applied.

The present invention makes it possible to simulate true braking situations, as encountered under actual driving conditions, while the motor vehicle itself is at rest on the brake testing apparatus, and hence, effective testing of vehicle brakes in all three of the above performance areas can be done to provide an accurate and reliable diagnosis of the condition of the brake system.

The invention may take various forms, but fundamentally it embodies two aligned sets or pairs of rolls, one set for supporting each wheel of a pair of front, or rear, vehicle wheels, and a separate electric motor connected to one roll of each pair of rolls for driving a pair of wheels supported on the two sets of rolls, at substantially the same speed, to simulate road travel at various speeds. The rolls that are connected with the electric motors apply a driving torque to the tires on the wheels while the wheel brakes are actuated to apply a braking force, and hence the torque loads applied by the electric motors work against the braking force, and the value thereof is a measure of brake performance. Means responsive to the motor torque effort is connected to each motor for indicating the power being absorbed by each wheel brake, said means including indicating means, one for each motor, embodied in a single instrument or gauge for providing simultaneous and continuous, comparative readings of brake effort for each wheel being tested. In this connection, it is preferred to provide a pair of pointers or indicator elements having a common starting point and arranged to cooperate with a single calibrated scale, and disposed so that they can be observed simultaneously to indicate instantly to an operator, and at a single glance, the power being absorbed by each brake throughout a test. If the positions of the two indicator elements coincide during the test, it is an indication that the pair of brakes being tested are at that time in balance. If the two indicator elements show different values, it indicates an unbalanced brake condition corresponding to the difference in values, or the extent of non-registry.

The invention contemplates the use of pneumatic, hydraulic and/or electrical means for effecting the independent and simultaneous actuation of the two indicator elements on a single instrument of high sensitivity, which elements for convenience are of different colors to identify the left side or right side wheel.

The invention further contemplates the use of a differential pressure responsive gauge for directly indicating which brake, at any instant, is applying a greater force than the other, and the difference between the two brake forces.

The principal object of this invention is to provide brake testing apparatus which will enable an operator to readily and simultaneously ascertain the functioning, capabilities, and unbalance, if any, of the brakes on any two rotating members, whether they be the front, or rear, wheels of a motor vehicle or other elements, so that appropriate adjustment, replacement, or repair can be made, or an evaluation can be made of the quality or state of the brake lining material.

Another object is to provide means including a single instrument or meter having dual indicating means for showing the comparative performance of the brakes on any pair of rotatable members at every instant during a brake test.

A further object is to provide apparatus, for testing the wheel brakes on a motor vehicle, that will simulate true braking situations as encountered in normal city and highway driving, while the motor vehicle rests on the apparatus and remains stationary.

Still another object is to provide brake testing apparatus including instumentation that is extremely sensitive and which will respond substantially instantaneously to indicate brake performance during momentary or transient conditions of brake lag, grab, fade and/or unbalance, as well as during a steady state of brake application.

A still further object is to provide fluid pressure control devices that will supply fluid to actuate fluid pressure responsive elements of a brake testing apparatus at a pressure directly proportional to the brake load on the respective wheels under test.

Still another object is to provide brake testing apparatus having electrically actuated indicator elements for indicating performance of the wheel brakes on a pair of vehicle wheels, arranged to be operable in accordance with variations in current demand on a pair of electric motors providing driving torque against which the brake force imposed on said wheels acts.

Other objects and many of the attendant advantages of the invention will become readily apparent from the following detailed description when considered in connection with the accompanying drawings, wherein:

Referring now to the preferred embodiment shown in FIGS. 1 to 13 of the drawings, the brake testing apparatus is indicated generally at 2, and includes a frame structure 4 received within a rectangular pit 6 in a concrete floor 8. Two pairs of rolls 10 and 12 are supported by the frame 4 in aligned relationship to receive the front wheels 14, or the rear wheels 16, of an automobile 18 on which the brakes are to be tested. An electric motor 20, 22 is connected to one roll of each pair of rolls 10 and 12, respectively, for driving the same. Each electric motor 20, 22 is of suitable capacity, for example, a 20 horsepower rating but capable of delivering 40 horsepower so that a total of 80 horsepower is available for brake testing. Each electric motor 20, 22 has a torque arm 24, 26, respectively attached thereto for operating a pneumatic weighing device 28, 30, respectively. Each weighing device 28 and 30 is arranged to measure the driving torque applied by its associated electric motor 20, 22, respectively and the pair of rolls 10, 12 associated therewith, to a wheel resting on said rolls while the brakes of said wheels are being applied. Each weighing device 28 and 30 furnishes a signal proportional to such driving torque to an instrument or meter 32.

Figure 13:
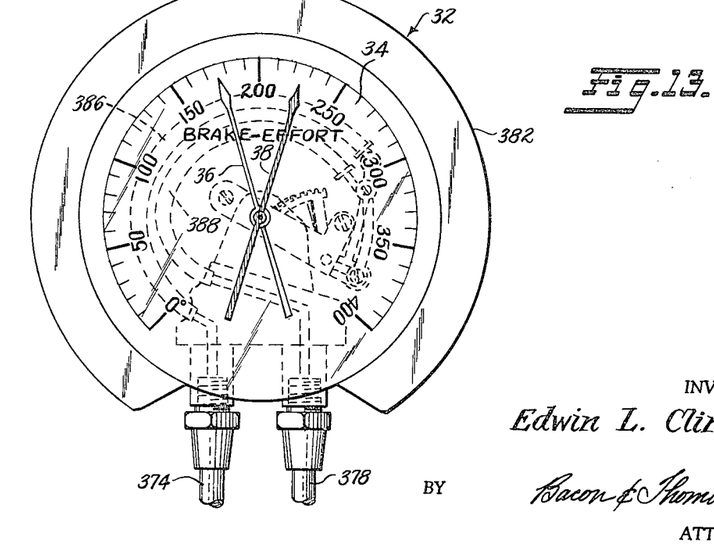
FIG. 13 is a front elevational view of a pneumatic gauge or meter having coaxial needles for simultaneously indicating the brake effort applied to each of a pair of wheels of a vehicle.

The meter 32 may take the form of a pressure gauge and, in any event, has a scale 34 over which a pair of separately actuated hands or pointers 36 and 38 travel. The pointers 36 and 38 are coaxially mounted, the pointer 36 being associated with the electric motor 20 and the pointer 38 being associated with the electric motor 22. Thus, the pointers 36 and 38 are arranged for simultaneous observation to indicate at a single glance the comparative performance of a pair of wheel brakes being tested. The manner in which the pointers 36 and 38 are actuated will be described later.

Figures 1, 2:
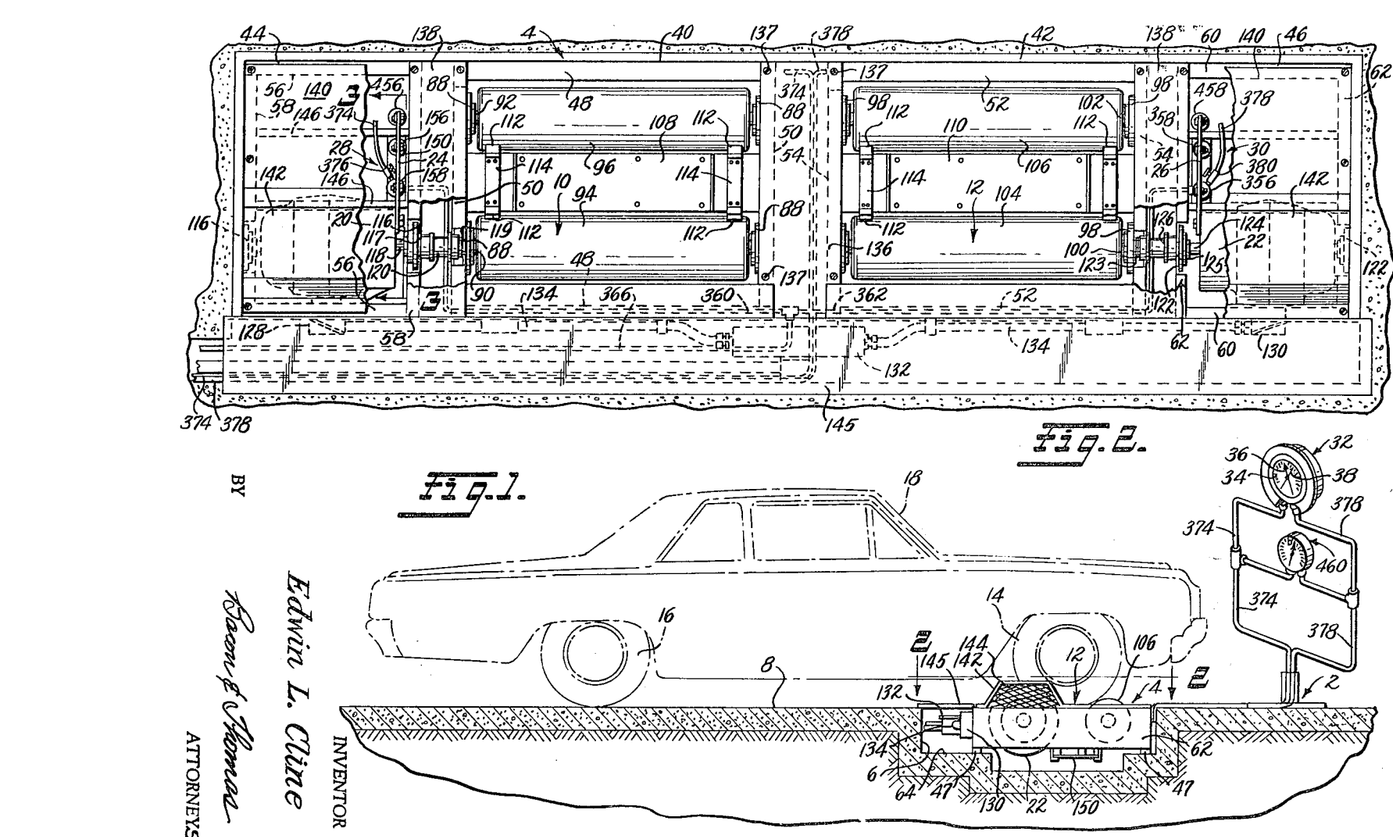
FIG. 1 is a side elevational view, partly in cross-section, of the preferred embodiment of the brake tester of the present invention, showing in phantom lines a vehicle in position thereon for testing the brakes on its front wheels.
FIG. 2 is an enlarged plan view of the brake tester of FIG. 1, with certain parts broken away to show further details and omitting the dual indicator instrument and the pressure differential gauge.
Figure 3:
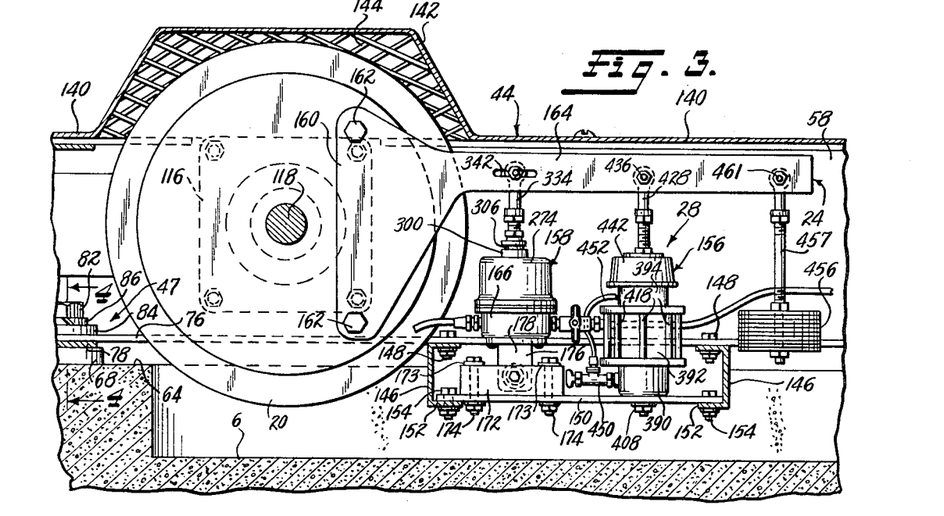
FIG. 3 is an enlarged fragmentary vertical sectional view, particularly showing the motor torque arm, pneumatic unit, and dash pot, taken on the line 3—3 of FIG. 2.
Figure 4:
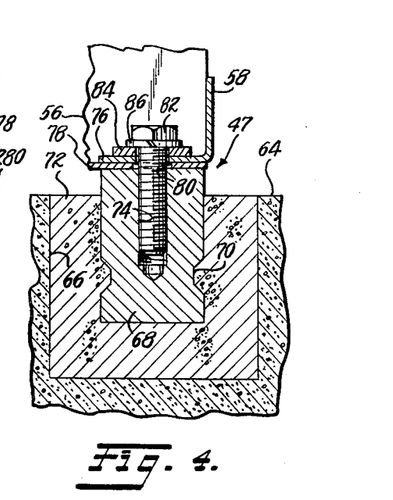
FIG. 4 is an enlarged fragmentary vertical sectional view, taken on the line 4—4 of FIG. 3 through one of the mounting pads for the brake tester frame.

Referring to FIG. 2, the frame structure 4 comprises two center sub-frame assemblies 40 and 42, and a pair of end sub-frame assemblies 44 and 46. The center sub-frame 40 comprises a pair of longitudinally disposed, parallel channel members 48 welded at their ends to a pair of transverse channel members 50, and the center sub-frame 42 is similarly comprised of longitudinal and transverse channel members 52 and 54, respectively. The horizontal legs of the pair of channel members 48, and the pair 50, confront each other; whereas, the horizontal legs of the pair of channel members 52 and the pair 54, extend oppositely. The end sub-frame 44 comprises a pair of longitudinal, parallel channel members 56 welded at their ends to a pair of transverse channel members 58, and the other end sub-frame 46 similarly comprises longitudinal and transverse channel members 60 and 62, respectively. The horizontal legs on all of the channel members 56 to 62 are directed inwardly. Each of the sub-frames 40 to 46 is anchored at each of its four corners by a like mounting pad 47 to a ledge 64 in the pit 6. The mounting pad assembly 47 for one corner of the sub-frame 44 is best shown in FIGS. 3 and 4.

The ledge 64 has a recess 66 beneath each corner of each sub-frame within which is received a cylindrical insert 68 having a peripheral anchoring groove 70. The inserts 68 are set in grout 72, so that the upper end thereof projects above the ledge 64. Each insert 68 has a threaded bore 74. The lower flange 76 of the channel members 58 overlies the lower flange 78 of the channel members 56 at the corners of the sub-frame 44, and an opening 80 is provided in the overlapped flanges 76 and 78 through which is passed a bolt 82. Washers 84 and 86 are disposed under the head of the bolts 82, and the bolts are threaded into the inserts 68 to firmly anchor their respective sub-frames. When the four sub-frames 40 to 46 are thus anchored within the pit 6, they jointly define the frame structure 4 of the brake testing apparatus.

The transverse channel members 50 of the center sub-frame 40 have confronting pairs of bearings 88 mounted thereon for supporting shafts 90 and 92 of rolls 94 and 96, respectively, comprising the set of rolls 10. Similarly, the transverse channel members 54 of the other center sub-frame 42 have confronting bearings 98 thereon for supporting shafts 100 and 102 of rolls 104 and 106, respectively, of the set of rolls 12. The rolls 94 and 96 of the roll set 10, and the rolls 104 and 106 of the roll set 12, are axially aligned and are spaced apart a distance sufficient to support the vehicle wheels 14, or 16, thereon.

The space between the rolls of said sets 10 and 12 is closed by lift plates 108 and 110, respectively, which need not be described in detail for present purposes.

The two pairs of rolls 10 and 12 are each equipped with pneumatically operated brakes of the type disclosed in U.S. Patent 3,182,758, which include brake bands 112 and guide plates 114. The brake means for the pairs of rolls 10 and 12 is fully disclosed in said U.S. patent, and hence will not be further described herein, except to point out that the same is operable by air pressure to simultaneously brake and hold both rolls of each set so that an automobile may be driven thereoff. For purposes of clarity, the air lines and valves for operating the roll brake means are not shown in the present drawings.

The transverse channel members 58 of the end sub-frame 44 have a pair of confronting bearings 116 mounted thereon in alignment with the shaft 90 of the roll 94, and the vertical flange of the transverse channel member 58 closest to the center sub-frame 40 has a cut-out 117 to receive the shaft 90. The electric motor 20 has a shaft 118 which extends completely through said motor and projects beyond both ends thereof, the opposite ends of said shaft 118 being mounted in the bearings 116 to thus cradle the motor 20 within the sub-frame 44. The end of the shaft 118 which projects toward the roll 94 extends through the cut-out 117 in the transverse channel member 58, and the confronting end of the shaft 90 is received in a similar cut-out 119 provided in the vertical flange of its associated channel member 50. The confronting ends of the shafts 90 and 118 are joined by a coupling 120, so that when the electric motor 20 is energized it will drive or rotate the roll 94. The roll 96 is not power driven, but is free to rotate in the manner of an idle roll.

The transverse channel members 62 of the other end sub-frame 46 have confronting bearings 122 mounted thereon in alignment with the shaft 100, within which bearings the opposite ends of the shaft 124 of the electric motor 22 are received to thus cradle said motor within the sub-frame 44. The vertical flanges of the confronting transverse channel members 54 and 62 have cut-outs 123 and 125, respectively, therein to receive the confronting ends of the shafts 100 and 124, said shaft ends being joined by a coupling 126. The roll 106, like the roll 96, is free to rotate in the manner of an idle roll.

The electric motors 20 and 22 have junction boxes 128 and 130, respectively, thereon, which extend through openings in the vertical flanges of their associated longitudinal channel members 56 and 60. A central junction box 132 is mounted at the center of one side of the frame 4, and electrical conduits 134 extend oppositely therefrom to the motor junction boxes 128 and 130 to carry electrical wiring thereto.

The space between the center sub-frames 40 and 42 is covered by a plate 136 secured in place on channels 50 and 54 by screws 137. Similar plates 138 cover the spaces between the center sub-frames 40 and 42 and their associated end sub-frames 44 and 46. The end sub-frames 44 and 46 each have a cover plate 140 with an inverted, U-shaped portion 142 positioned over its associated electric motor 20 and 22, respectively. The open ends of the U-shaped portions each have an open grill 144 secured therein. The open grills 144 thus provide for circulation of air to the electric motors 20 and 22. A ramp plate 145 covers the junction boxes 128, 130 and 132 and the conduits 134, and bridges the gap between the frame 4 and the surface of the floor 8 outside the pit 6.

The pneumatic weighing devices 28 and 30 are identical in construction, and hence only the device 28 will be described in detail. Referring to FIG. 3, the transverse channel members 58 of the end sub-frame 44 have a pair of parallel, confronting channel members 146 secured to the lower flanges 76 thereof by bolts 148. A mounting plate 150 extends transversely between the channel members 146 and rests on and is secured to the lower confronting flanges 152 thereof by bolts 154. The center line of the mounting plate 150 is disposed on a vertical plane coinciding with the front face of the electric motor 20. The mounting plate 150 supports thereon a dash pot 156 and a pneumatic weighing unit 158.

The torque arm 24 has a wide end 160 with a pair of vertically aligned openings through which bolts 162 pass and are threaded into the housing of the motor 20 to secure the torque arm to the front face of said motor. A relatively narrow arm portion 164 extending from the end 160 is disposed over the plate 150. As is shown in FIG. 3, the center line of the torque arm portion 164 extends generally horizontally, and is spaced a substantial distance above the center line of the motor shaft 118. When the brake of a wheel disposed on the set of rolls 10 is applied while the motor 20 is energized to rotate said wheel, the reaction of the driving force or torque being applied to the roll 94 will cause the housing of the motor 20 to rotate slightly about the axis of the shaft 118. The torque arm 24 is secured to the motor housing so that the torque arm portion 164 will move angularly about the shaft 118 in proportion to the applied driving torque and, hence, to the braking force being applied to the wheel.

The pneumatic weighing unit 158 is shown in detail in FIGS. 5 to 8, and includes a lower housing portion 166 having an upwardly opening chamber 168 therein and terminating at its upper end in an annular flange 170. The mounting plate 150, FIGS. 3 and 5, has a pair of plates 172 secured thereto by washers 173 and bolts 174 to extend parallel with the center line of said mounting plate, the bolts extending between the plates. Also received between the plates 172 is a depending leg 176 of a mounting bracket 178, which includes a base 180 secured to the lower side of the housing portion 166 by screws 184 and which has a blind cylindrical bore 192 in its upper face. The bracket leg 176 has a transverse opening 182 fitted with a conventional spherical bearing 186 supported by a pair of bushings 187. A bolt 188 extends through aligned openings 190 in the plates 172 and through the bearing 186 to mount the lower housing portion 166 for universal movement relative to the plate 150.

Figure 5:
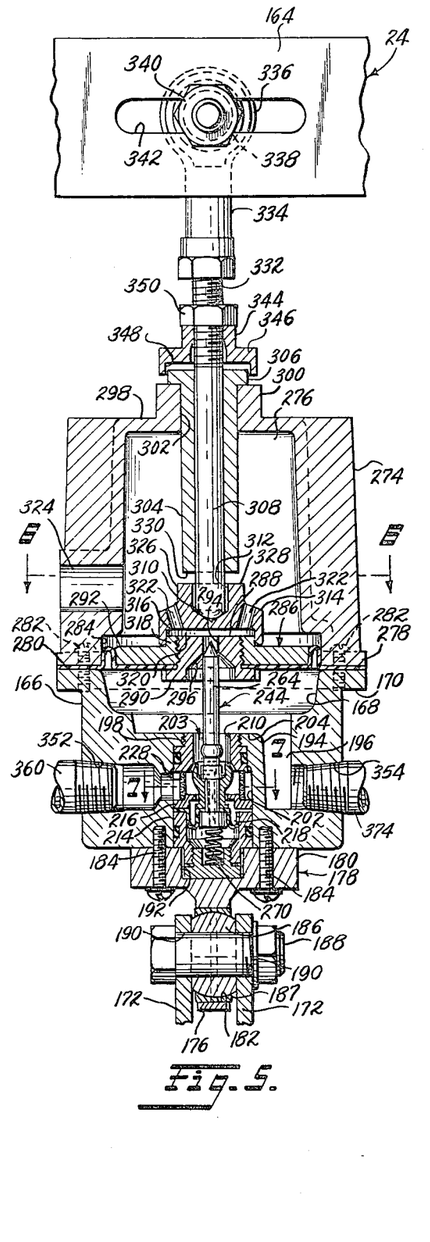
FIG. 5 is an enlarged vertical sectional view through the pneumatic unit of FIG. 3.
Figure 6:
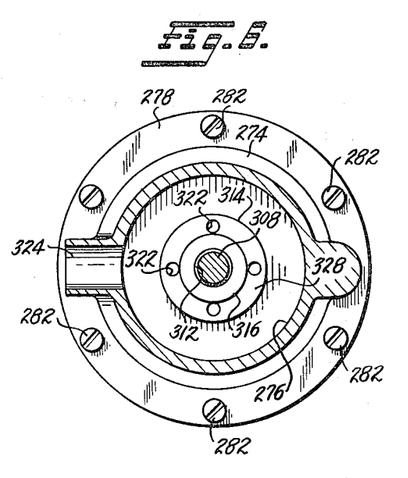
FIG. 6 is a horizontal sectional view, taken on the line 6—6 of FIG. 5.
Figure 7:
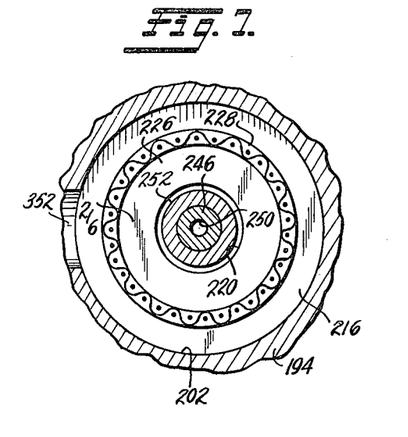
FIG. 7 is an enlarged fragmentary horzontal sectional view, taken on the line 7—7 of FIG. 5.

The plates 172, as has been noted, extend parallel to the center line of the mounting plate 150. By merely loosening the bolts 174, the plates 172 can be freed for sliding movement parallel to the center line of the plate 150, whereby the position of the lower housing portion 166 along said center line can be easily adjusted. When the housing portion 166, and hence the unit 158, has been properly positioned the bolts 174 are tightened.

Formed integrally with portions of the bottom and side wall of the chamber 168 is a central boss 194, one portion of the side wall of said chamber being spaced from said boss to define a passage 196. The lower housing portion 166 has a stepped bore extending through the boss 194, and includes a reduced, threaded upper portion 198, an intermediate cylindrical portion 200, and a relatively longer enlarged cylindrical lower portion 202. Received within the stepped bore is a control valve 203 including a flanged seat member 204 having a threaded upper end which is screwed into the bore portion 198. The flange on the lower end of the seat member 204 is received within the intermediate cylindrical bore portion 200 and has a groove containing a ring 208 forming a seal with said bore portion. The seat 204 has an air supply passage 210 which terminates at its lower end in a frusto-conical seat 212.

Figure 8:
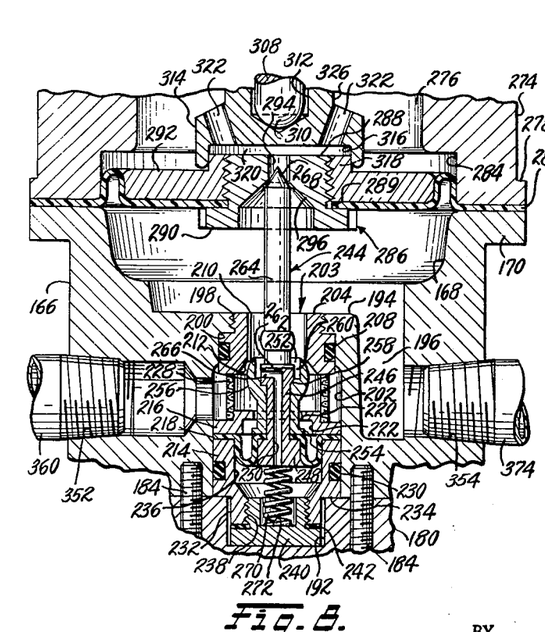
FIG. 8 is a further enlarged fragmentary vertical sectional view of the control valve portion of FIG. 5.

The control valve 203 further includes a lower body portion 214 and an intermediate body portion 216, between which the outer margin of a rolling diaphragm 218 is clamped. The body portions 214 and 216 are snugly received within the lower bore portion 202. The intermediate body portion 216 has an opening 220, which leads to an enlarged counterbore 222, the bottom wall of which defines an annular stop shoulder about the opening 220. The intermediate body portion 216 also has a circular boss 226 on its upper face surrounded by a seat for the lower end of a cylindrical screen 228 clamped between said intermediate body portion and the lower face of the seat 204.

The lower body portion 214 of the control valve 203 has a groove, within which is received a ring 230 forming a seal with the bore portion 202, and terminates at its lower end in a reduced cylindrical portion 232 received within the blind bore 192 in the bracket base 180. A shoulder 234 surrounds the cylindrical portion 232, and the upper face of the bracket base 180 is engaged with the shoulder 234 to clamp the elements 214, 218, 216 and 228 of the control valve 203 in assembled relationship against the seat member 204.

The lower body portion 214 has a chamber 236 of greater diameter than the counterbore 222. The outer wall of the convolution of the diaphragm 218 is arranged to have rolling contact with the wall of the chamber 236. A reduced, threaded bore 238 is located at the lower end of the chamber 236, and is closed by a flanged plug 240. A gasket 242 is disposed between the flange on the plug 240 and the confronting end of the cylindrical portion 232.

The convoluted, rolling diaphragm 218 supports a valve stem assembly 244 that includes a cylindrical inner core 246, which extends through a central opening in the diaphragm 218, and terminates at its lower end at a flange 248 upon which the diaphragm 218 seats. The inner core 246 has an axial passage 250 extending therethrough.

Received on the inner core 246 is an outer core 252 having a flange 254 at the lower end thereof which engages the top surface of the diaphragm 218. The flange 254 has an outer diameter substantially less than that of the counterbore 222. The upper end 256 of the outer core 252 has a partially spherical configuration, and is engageable with the frusto-conical seat 212 when the valve stem assembly 244 is moved upwardly, to thus close the air supply passage 210. The upper end of the outer core 252 has a counterbore 258 and an enlarged bore 260 therein, and received within the former is the lower cylindrical end 262 of a needle valve stem extension 264. The lower stem end 262 has an elbow-shaped passage 266 therein, which communicates with the passage 250 for conducting pressure to the lower side of the diaphragm 218 to pressure-balance the valve stem assembly 244. The needle valve stem extension 264 extends upwardly through the air supply passage 210, and terminates in a conical tip 268.

The valve stem assembly 244 is normally urged upwardly by a compression spring 270 disposed beneath the inner core member 246, the lower end of said spring being received within a seat 272 in the plug 240. The compression spring 270 is arranged to counterbalance the weight of the pneumatically balanced valve stem assembly 244 upwardly until the spherical portion 256 on the outer core member 252 sealingly engages the frusto-conical seat 212 to close the passage 210.

The pneumatic weighing unit 158 further comprises an upper housing portion 274 having a downwardly opening vent chamber 276, and a flange 278 at its lower end which confronts the flange 170. The outer margin of a convoluted, rolling diaphragm 280 is clamped between the flanges 278 and 170, which are secured together by screws 282. The upper housing portion 274 includes a cylindrical recess 284 at the lower end of the chamber 276 within which the convolution of the diaphragm 280 is received.

The diaphragm 280 carries an air exhaust valve seat assembly 286, including a threaded seat member 288, which extends through an opening 289 in the diaphragm 280 and has a flange 290 on its lower end engaged with the lower face of the diaphragm 280. A diaphragm supporting disc 292 is threaded onto the seat member 288 to clamp the inner margin of the diaphragm 280 therebetween. The diameter of the disc 292 is substantially less than that of the recess 284. The inner and outer sidewalls of the convoluted portion of the diaphragm 280 are supported by and roll upon the periphery of the disc 292 and the encircling wall of the recess 284, respectively. The seat 288 has an axial air exhaust passage 294 terminating at its lower end in a frusto-conical seat 296 for receiving the conical tip 268 on the valve stem assembly 244.

The upper end 298, FIG. 5, of the upper housing portion 274 has a central boss 300 with an opening 302 in which is fitted an elongated bushing 304 having a flange 306 at its upper end. A push rod 308 extends through the bushing 304 and has a rounded lower end 310 received in a bore 312 in a thrust member 314. The thrust member 314 has a recess 316 in its lower face to receive a circular boss 318 on the disc 292, the recess 316 having a depth equal to about twice the vertical height of the boss 318, whereby a space 320 is formed between the top of the boss 318 and the bottom wall of the recess 316. A plurality of circumferentially spaced, outwardly inclined passages 322 connect the space 320 with the vent chamber 276. The upper housing portion 274 has a port 324 which exhausts air from the vent chamber 276 to the atmosphere. The thrust member 314 has a cylindrical portion 326 of a diameter such as to lie inwardly of the passages 322 and terminates in a flat upper end face 328. The bushing 304 has a lower end face 330 which confronts the end face 328, and is normally spaced therefrom. However, the space between the confronting faces 328 and 330 is such that if an excessively large pressure should be present beneath the diaphragm 280, the face 328 will engage the face 330 to prevent excessive upward displacement of said diaphragm.

The upper end 332 of the push rod 308 is threaded, and a connector 334 having an eyelet 336 at its upper end is mounted thereon. The eyelet 336 contains a spherical bearing 338 similar to the bearing 186, and is attached to the portion 164 of the torque arm 24 by a bolt 340 which extends through a longitudinal slot 342 in said torque arm and through the bearing 338. Thus, as the torque arm 24 oscillates about the axis of the motor shaft 118, the push rod 308 will be moved up and down. The slot 342 extends horizontally so that the position of the upper end of the weighing unit 158 can easily be adjusted over the length of said slot by loosening the bolt 340, and sliding the bolt 340 to the desired position, and then tightening the bolt. Such adjustment of the unit 158 may be necessary when calibrating the weighing devices 28 and 30.

The extent to which the push rod 308 can be moved downwardly is limited by a threaded collar 344 having a flange 346 with a recess 348 in its lower face of a size to receive the flange 306 of the bushing 304. The collar 344 is adjusted on the push rod 308 so that when moved downwardly, it will engage the flange 306 just before the needle valve stem assembly 244 and the valve assembly 286 bottom completely. The collar 344 is held in adjusted position by a lock nut 350.

The pneumatic weighing unit 158 is continuously in communication with air under pressure through a supply conduit 360 and an inlet port 352 opening into the bore 202 at a position confronting the filter screen 228, the latter having a smaller diameter than the diameter of the bore 202, whereby to provide an annular chamber to receive the incoming air. Air entering through the inlet port 352 flows through the screen 228 and upwardly through the supply passage 210, when the spherical stem portion 256 is not seated on the frusto-conical seat 212. The lower body portion 166 of the unit 158 has an outlet port 354, which is continuously in communication with the pressure chamber 168 through the passage 196 to supply a signal pressure to an indicator instrument, corresponding to torque arm actuation, as will be pointed out later.

The weighing device 30 associated with the motor 22 is identical to the weighing device 28, and includes a pneumatic weighing unit 356 identical in construction to the unit 158. An inlet pressure line 362 similar to the inlet pressure line 360 is connected to the inlet port of the weighing unit 356. The inlet pressure lines 360 and 362, as is best shown in FIG. 2, extend through the frame 4 to a position at the center thereof between the two sets of rolls 10 and 12, where they are connected to a single air supply line 366. The supply line 366 extends to a suitable source of air under pressure (not shown), and is equipped with a conventional air filter and water trap 368 (FIG. 12), and an air pressure regulator 370. A control valve 372 is positioned downstream of the regulator 370. While for purposes of clarity the air supply system for the pneumatic brakes (not shown) on the rolls 94, 96, 102 and 106 has not been illustrated, such can also be connected to the supply line 366 to receive operating air pressure.

Figure 12:
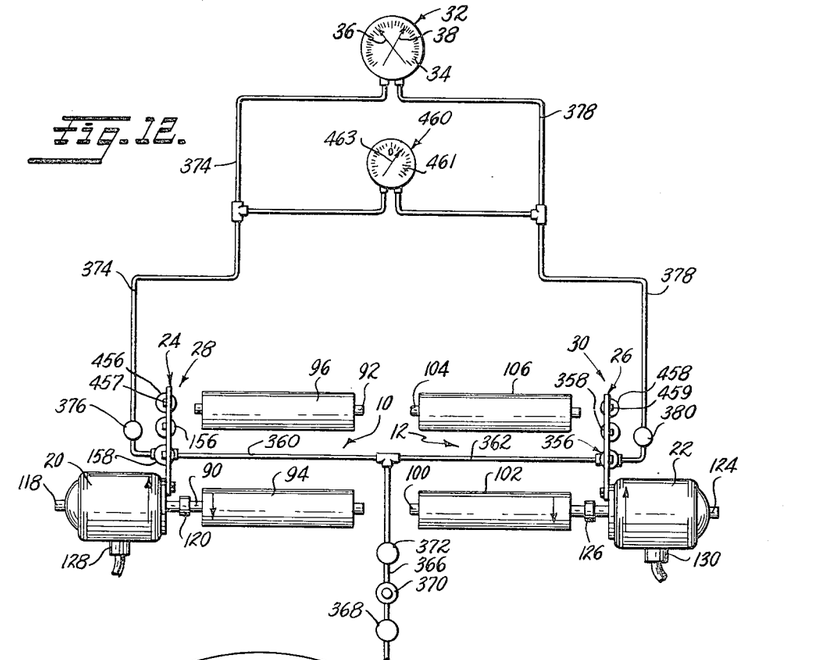
FIG. 12 is a diagrammatic view of the brake tester of FIG. 1 including the indicating meters and other components of the system.

The outlet port 354 of the weighing unit 158 has a signal pressure line 374, FIG. 12, connected thereto, a pressure control valve 376 being connected in the line 374 adjacent the weighing unit 158. A similar signal pressure line 378 is connected to the outlet port of the weighing unit 356, and has a pressure control valve 380 therein. The valves 376 and 380 are effective to control the rate of pressure supplied to and released from the meter 32 during rapidly changing pressure or transient conditions to prevent "over-shoot" or "under-shoot" on the meter.

The signal pressure lines 374 and 378 conduct operating air pressure to the instrument or meter 32, and extend through the frame 4 to the center thereof from where they are brought out in parallel for connection to the meter. The signal pressure lines 374 and 378 are made substantially equal in length and of the same size, to ensure that the pressure characteristics in the two lines are identical. This precaution avoids unbalance in the meter 32, which might otherwise result.

The meter 32, as is shown in FIGS. 1, 12 and 13, includes a casing 382 within which is mounted the circular dial 34 calibrated to indicate pounds of force or brake effort tangent to the surface of the tires at their point of contact with the rolls 94 and 104. The dual pointers 36 and 38 are coaxially mounted in the casing 382 to rotate about a common axis relative to the dial 34, the pointer 36 being associated with the left side weighing device 28 and the left wheel-engaging roll set 10, and the pointer 38 being associated with the right side weighing device 30 and the right wheel-engaging roll set 12. The pointers 36 and 38 are of different color, say black and red, respectively, as indicated in FIG. 13 by appropriate cross-hatching. Such different colors greatly facilitate the reading of the meter 32 since the black pointer 36 indicates the functioning of the left wheel brake, and the red pointer 38 indicates the functioning of the right wheel brake.

The pointer 36 is connected within the casing 382 to a conventional pressure-responsive Bourdon tube mechanism 386, to which the signal pressure in line 374 is communicated. The pointer 38 is connected to a similar Bourdon tube mechanism 388, which is supplied with air pressure from the signal pressure line 378. Thus, each pointer 36 and 38 is independently actuated in accordance with the magnitude of the air pressure acting upon its associated Bourdon tube. As is shown in FIG. 13, the dial 34 reads "0" to "400." However, 330 pounds pull at the wheel rim is equivalent to the maximum 40 horsepower from each motor 20, 22, and it is preferable not to perform tests with braking effort above this value, nor to perform a test at this value, except for short periods of time. The pointers 36 and 38 are both at the "0" (zero) reading at the start of a test, so that any unbalance in braking effort during a test will be indicated by the extent of angular displacement of one pointer relative to the other.

When using the present sensitive pneumatic weighing devices 28 and 30, it is necessary to dampen the movement of the torque arms 24 and 26. It has already been mentioned that the torque arm 24 has a dash pot 156, FIGS. 3 and 12, connected thereto. A dash pot 358 similar to the dash pot 156 is connected with the torque arm 26. Hence, a description of the dash pot 156 will suffice for both.

Figures 9, 10, 11:
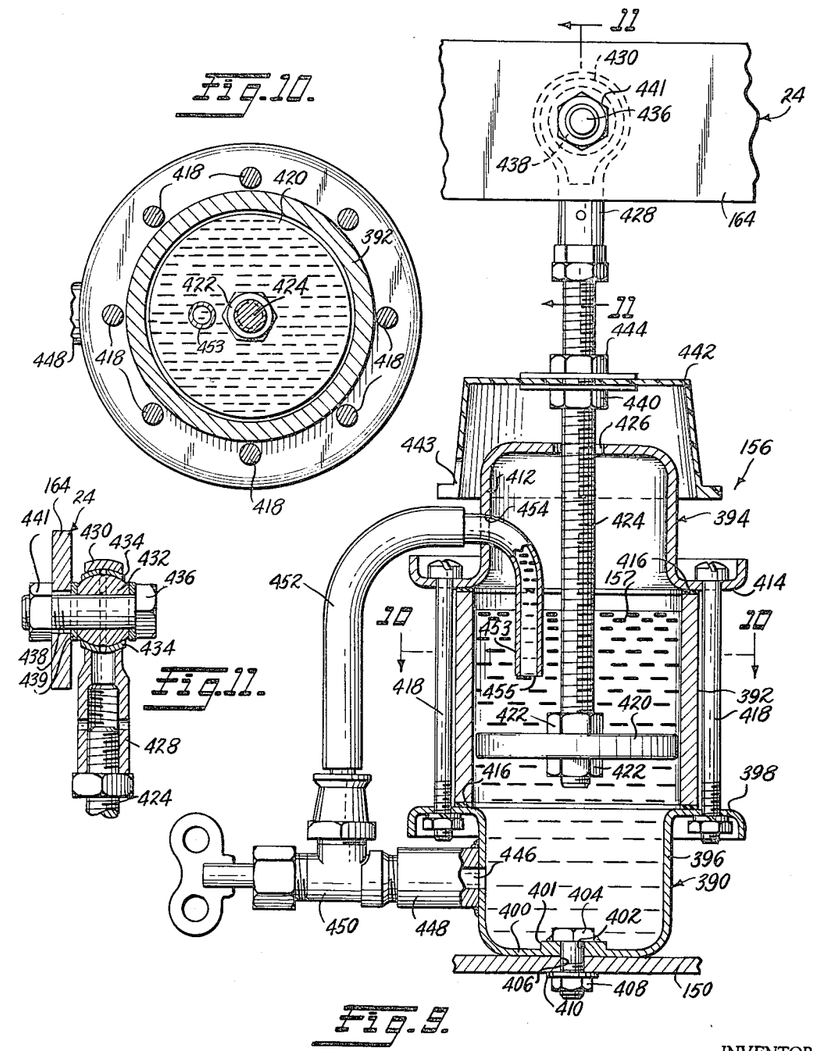
FIG. 9 is an enlarged fragmentary vertical sectional view through the dash pot device of FIG. 3.
FIG. 10 is a horizontal sectional view, taken on the line 10—10 of FIG. 9.
FIG. 11 is a fragmentary vertical sectional view, taken on the line 11—11 of FIG. 9 showing the universal mounting provided for the upper end of the dash pot rod.

Referring to FIGS. 9 to 11, the dash pot 156 includes a housing having a lower section 390, a cylindrical intermediate section 392, and a cap 394. The lower section 390 is a cup-like member formed from sheet metal, and includes a side wall 396 terminating at its upper end in an annular flange 398 having a down-turned marginal edge and a bottom wall 400 having a central boss 401 with an opening 402. A bolt 404 extends downwardly through the opening 402, and its head is welded to the boss 401. The bolt 404 extends through an opening 406 in the mounting plate 150, and the housing section 390 is secured to said plate by a nut 408 and a washer 410 carried by said bolt.

The cap 394 is formed similarly to the lower section 390, and includes a side wall 412 terminating at its lower end in an annular flange 414 having an up-turned marginal edge. The intermediate section 392 is interposed between the confronting flanges 398 and 414, a gasket 416 being positioned at each end thereof, the entire housing being held assembled by a plurality of circumferentially spaced bolts 418 interconnecting the flanges 398 and 414.

Slidably received with a slight clearance within the intermediate section 392 is a disc-like piston 420, which is connected by nuts 422 to the lower end of a threaded rod 424. The rod 424 extends through an opening 426 in the top wall of the cap section 394, and has a connector 428 threaded on the upper end thereof terminating in an eyelet 430. The eyelet 430, like the eyelet 336, is fitted with a spherical type bearing 432 (FIG. 11), mounted in bronze inserts 434.

The dash pot 156 is speced radially outwardly from the weighing unit 158, FIG. 3, a distance equal to about one-half the distance between the weighing unit 158 and a vertical plane passing through the axis of the shaft 118. The connector 428 is pivoted to the torque arm portion 164 by a bolt 436 which passes through an opening 438 in the latter. A washer 439 is disposed between the arm portion 164 and the connector 428, to provide adequate clearance for the latter to move. A nut 441 is mounted on the bolt 436.

The piston 420 is prevented from engaging the lower housing section 390 by a stop nut 440 threaded on the push rod 424. An inverted, cup-shaped dust cover 442 is supported by the stop nut 440, and is secured in position by a lock nut 444 to shield the opening 426.

The lower housing section 390 has a port 446 in the side wall 396 thereof, and a nipple 448 is welded exteriorly about said port. A conventional angle type needle valve 450 is threaded at its inlet into the nipple 448, the outlet of said needle valve is connected to a flexible tube 452, which extends upwardly and is connected to a metal tube 453 projecting through an opening 454 in the side wall 412 of the cap 394. The dash pot 156 contains oil 157 at a level nearly to the top of the intermediate section 392. The piston 420 is at all times submerged in the oil 157. The lower end 455 of the tube 453 extends to a point well beneath the surface of the oil 157, and sufficient space is provided between it and the piston 420 to allow for proper operation of the dash pot. The dash pot thus embodies a closed system, in that both the tube end 455 and port 446 are at all times contained within the body of oil 157.

The nipple 448, the needle valve 450, and the tubes 452 and 453 function as a by-pass to transmit oil from one side of the piston 420 to the other side thereof, the rate of such transfer, and hence the rate of damping, being controlled by the adjustment of the needle valve 450. Thus, when the piston 420 is forced downwardly, oil is forced through the nipple 448, valve 450, and tubes 452 and 453, and is discharged above the piston. A vertical slot 443 in the cover 442 provides clearance for the tube 452 when the piston 420 is in a depressed position. When the piston moves upwardly, a slight suction effect is created which causes oil to be drawn through the tubes 452 and 453 from above the piston for return to the space beneath the piston through the port 446.

The weighing devices 28 and 30 associated with the electric motors 20 and 22, respectively, are initially calibrated by placing weights of suitable values at fixed positions on the torque arms 24 and 26, and then adjusting the effective torque arm length of the weighing units 158 and 356 to obtain identical readings on the meter 32 for identical angular movements of the torque arms 24 and 26. Such adjustment in the effective torque arm lengths are easily made by loosening the bolts 174 and 340, as has been explained. Tare weights 456 and 458, FIGS. 3 and 12, are suspended by links 457 and 459 pivotally mounted at a point near the free end of the torque arms 24 and 26, respectively, and are preferably used in conjunction with the zero adjustment on the meter 32 to create a slight pre-load on the system. FIG. 3 shows the link 457 pivotally connected by a bolt 461 to the torque arm 24. The link 459 is likewise connected with the torque arm 26.

As is shown in FIG. 12, a differential pressure gauge 460 can be connected between the signal pressure lines 374 and 378, to measure the value of the differential pressure therebetween. The gauge 460 comprises a dial 461 having a zero reading at its mid-point and graduations of increasing increments on both sides of the zero reading. A pointer 463 moves across the dial in one direction or the other, depending upon which signal line contains the greater pressure. A reading thus obtained is occasionally useful because it will reveal instantly any brake unbalance, measure directly the amount of such unbalance, and indicate by right or left movement which of the wheel brakes is less effective. The pointers 36 and 38 on the gauges 32, of course, also indicate by their extent of non-registry the amount of any unbalance of the brakes on the two wheels.

The electric motors 20 and 22 connected to the rolls 94 and 102, respectively, will when energized rotate their associated rolls and the wheels resting thereon, preferably at about 46 m.p.h. It should be noted that the motors 20 and 22 have similar operating characteristics, so that both wheels of a pair will be rotated at substantially the same speed and under equal torque. Test application of the wheel brakes while their associated wheels are being driven by the motors 20 and 22 causes a retarding force to be applied to the rotating wheels which is countered by the motor output torque. This motor output torque is directly related to the degree of brake force, and it is this value that is measured for each wheel by its associated weighing device 28 or 30 and indicated on the meter 32 in terms of "brake effort" (retarding force at the tire surface). As has been emphasized, no interconnection is made between the right side pair of rolls 12 and the left side pair of rolls 10; rather, the loads are applied independently to one roll of each of the two sets of rolls 10 and 12, and each pair has its own force measuring system so that any brake unbalance is clearly indicated on the single meter 32 by the extent of non-registry of the pointers 36 and 38.

Measuring of the motor output torque or brake effort is accomplished by sensing the reaction drag on the housings of the motors 20 and 22, which motors are cradled in the bearings 116 and 122, respectively, to allow the housings to transmit the respective reaction torques through the torque arms 24 and 26 to the pneumatic weighing units 158 and 356, respectively. The weighing units 158 and 356 measure the force being applied to them, and produce air pressure signals that are directly proportional to said forces. These signals are transmitted to the Bourdon tubes 386 and 388, and the pointers 36 and 38 connected thereto register on the dial 34 the load being absorbed by the vehicle wheel brakes.

The design of the weighing units 158 and 356 is based on the force-balance principle, which provides instantaneous response and a high degree of accuracy. Referring to the unit 158, the pressure control chamber 168 is constantly in communication with the Bourdon tube 386 through the sensing pressure line 374 connected to the outlet port 354. Hence, the air pressure existing in the chamber 168 will be continually measured and indicated by the pointer 36 regardless of fluctuations.

Air is supplied through the inlet pressure line 360 to the control valve assembly 203. When the spherical valve stem portion 256 is urged downwardly away from the frusto-conical seat 212 by a load on the torque arm 24, air is admitted to the pressure chamber 168 through the air supply passage 210. It will be understood that the valve stem portion 256 is moved to its open position by downward movement of the push rod 308, which downward movement first firmly seats the frusto-conical seat 296 on the conical relief valve tip 268 to close the air exhaust passage 294. Further downward movement of the push rod 308 then opens the control valve 203, the extent of such opening being dependent upon the value of the force urging the rod 308 downwardly against the force of the compression spring 270, and against the air pressure beneath the diaphragm 280 in the pressure control chamber 168. It is evident that when air is entering the chamber 168 through the air supply passage 210 the exhaust passage 294 will be closed, whereby a pressure build-up will occur in the chamber 168, such build-up being transmitted by the signal pressure line 374 to the meter 32.

When the pressure within the chamber 168 builds up sufficiently to balance the downward pressure exerted on the push rod 308, the diaphragm 280 will move upwardly to a null position, which is the point at which both the air supply passage 210 and the air exhaust passage 294 are closed. While the diaphragm 280 is in such a null position, the air pressure within the chamber 168 will remain static, and such will be indicated by stability of the pointer 36.

When thereafter the downward force on the push rod 308 lessens, the air pressure within the control chamber 168 will cause the diaphragm 280 to move upwardly from its null position, thus opening the exhaust passage 294 while the supply passage 210 remains closed. Air pressure is then exhausted through the passage 294, to chamber 320, to passages 322, into chamber 276 and thence-through the port 324 to the atmosphere, until the downward pressure on the push rod 308 is in balance with the pressure beneath the diaphragm 280, whereupon the diaphragm 280 will again move to a null position and the passages 210 and 294 will be closed.

Force is applied to the push rod 308, as has been explained, by the torque arm 24 attached to the housing of the motor 20, the movements of the torque arm 24 being in response to changes in the braking effort under the torque output of the motor 20 as the brakes being tested are applied. Any change in force on the push rod 308, increasing or decreasing, affects the pressure balance within the pneumatic weighing unit 158 and causes the diaphragm 280 to move from a null position, resulting in the action necessary (admitting or exhausting air to or from the diaphragm chamber 168) to correct the air pressure within the chamber 168 to regain force-balance.

From the foregoing it will be seen that a direct relationship exists between the air pressure within the chamber 168 under the diaphragm 280 and the force applied to the push rod 308 by the torque arm 24. Linearity of this relationship and sensitivity of the weighing unit 158 is dependent on several things. The effective area of the diaphragm 280 must remain constant, movement must be as nearly as possible without friction, and detrimental seat forces must be kept to a minimum. These requirements are met, insofar as the diaphragm 280 is concerned, by the use of a convoluted diaphragm which is side wall supported. This design maintains essentially a constant effective diaphragm area throughout the pressure and stroke range, and during movement, the rolling action of the diaphragm 280 results in extremely low friction.

Seat forces are balanced on the control valve assembly 203 by the lower convoluted, rolling diaphragm 218 and the stem passages 266 and 250. The passages 266 and 250 admit air from the pressure chamber 168 to the lower side of the rolling diaphragm 218, whereby the pneumatic forces acting on the portions of the valve stem 244 above the diaphragm 218 are balanced with those acting on the portions of the valve stem below said diaphragm. The use of the convoluted, rolling diaphragm 280 and balancing of the forces on the control valve unit 203 result in an air pressure signal to the meter 32 which is related in a substantially linear manner to the force or torque effort of the motor in overcoming braking force, and in a weighing unit provide sensitivity such that even very small force changes are measured.

An inherent instability usually exists in devices that use the pneumatic force-balance principle, unless some dampening action is applied. Many things contribute to such instability, and such is especially true when the design of the pneumatic weighing unit allows for high response, and changes in the applied force are rapid. Without dampening, the pneumatic weighing unit tends to over-correct for the force change, resulting in oscillations commonly called "hunting." The angular movement of the torque arms 24 and 26 is very slight. The large diameter of the air supply passage 210 enables rapid responses to occur with only slight opening of the valve, so that transient conditions in brake effort of both brakes are instantly reflected by the meter 32.

To provide the necessary dampening, the dash pot 156 is connected to the torque arm 24, and an identical dash pot 358 is connected to the torque arm 26, as previously explained.

In the use of the apparatus of FIGS. 1 to 13, after the wheels 14 of the vehicle 18 have been placed on the pairs of rolls 10 and 12 and the motors 20 and 22 have been energized, the testing of the brakes usually takes but a few minutes. It will be understood that vehicles equipped with power brakes will require that the engine be in operation and that the transmission be in neutral position. The motors 20 and 22 are started under reduced power and after approximately 3 seconds the motors are at full power. In this manner the wheels are accelerated at a modest rate to a predetermined driving speed. The motors 20 and 22 have similar operating characteristics and rotate at the same speed. With the motors 20 and 22 driving the wheels at a speed approaching highway driving conditions, preferably about 46 m.p.h., the meter 32 is first read before the brakes are applied. Normally, the rolling resistance of the wheels will produce a small reading on the meter 32, but if a larger than normal initial reading is observed, this would indicate a brake malfunction. In further proceeding with the test, the brakes are gently applied adding 10 to 20 pounds brake effort to determine the presence of mechanical drag which may restrict movement of the brake frictional members and cause the brakes to be applied unevenly. As the brakes on the two wheels are applied, the weighing units 158 and 356 will measure the increasing brake effect offsetting the torque output of the respective motors 20 and 22, and these will be indicated on the meter 32. If both brakes apply load simultaneously and equally, the two pointers 36 and 38 will start and continue to move together. The brakes are then released slowly and both pointers should start to fall at the same time and at the same rate. The brakes are then more firmly applied to learn the feel of the pedal or brake actuator to obtain 50 to 70 pounds brake effort. A rapid braking application, under the same range of force, is then made. If one of the brake fluid lines is "pinched" and retards flow of brake fluid to a wheel cylinder, this condition will be revealed by a momentary delayed action in brake force application and a corresponding delay in movement of one of the pointers 36 or 38. Any unbalance developed or any sudden brake force application on one wheel will be instantly indicated as soon as it occurs by non-registry of the pointers.

In continuing the test, still higher brake efforts are applied as dictated by the size of vehicle and held for five to seven seconds. If any tendency to fade exists, it will be instantly indicated by reverse movement of one or both of the pointers 36 and 38. Because of the rapid speed at which the wheels are rotating, this test will result in heat generation at the surface of the brake linings similar to that encountered in making an emergency or quick road-stop from high speeds. Any change in brake lining friction characteristics resulting from the sudden increase in temperature, will be instantly indicated by the pointers 36 and 38.

The unbalance between the braking effect on the two wheels will be indicated by the difference in the values shown by the pointers 36 and 38 on the meter 32, and by the reading on the gauge 460 if employed.

If the unbalance is about 50 pounds, this indicates that improved action is possible by cleaning and adjusting the brakes. An unbalance of about 60 pounds would indicate that the brakes are marginal and could be dangerous in a panic stop. An unbalance of about 70 pounds would indicate that the brakes are not safe and should be repaired. Any unbalance above 70 pounds would indicate that the brakes are not safe under any driving conditions.

Figure 14:
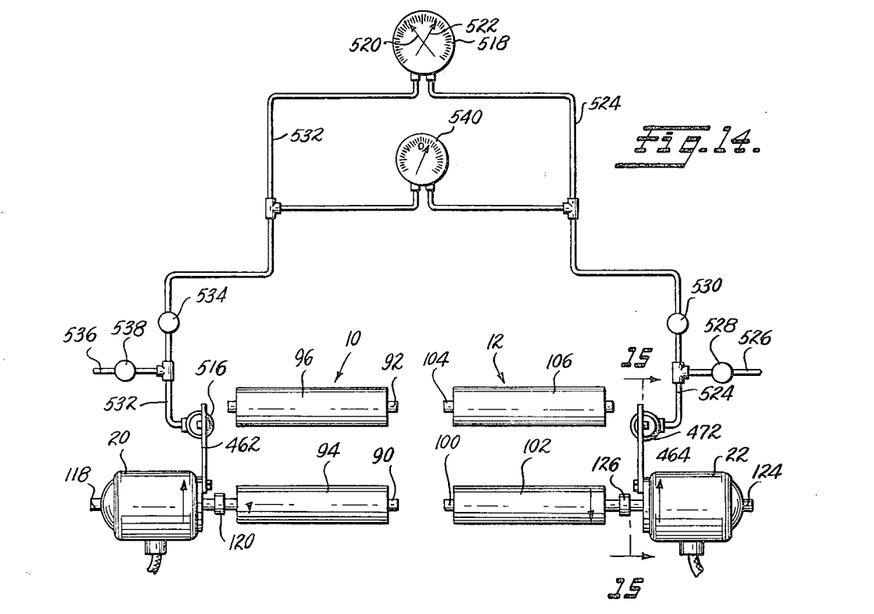
FIG. 14 is a diagrammatic view of another embodiment of the brake testing system, wherein hydraulic means is arranged to actuate the indicating instruments.
Figure 15:
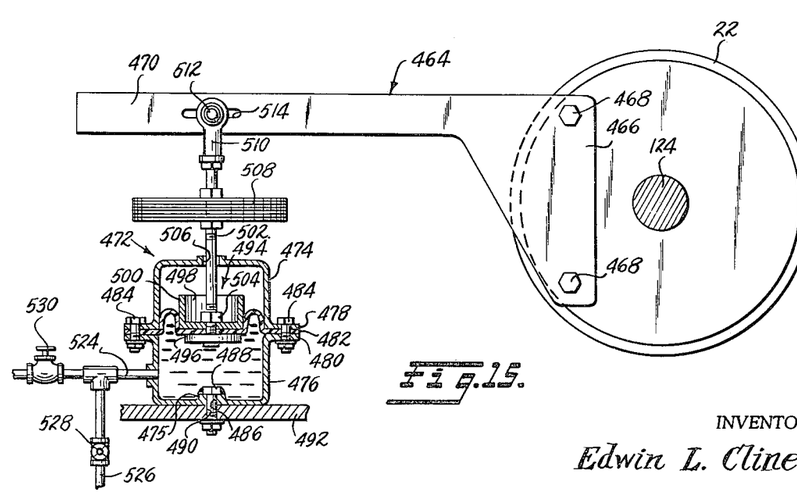
FIG. 15 is an enlarged vertical sectional view through a hydraulic actuator, taken on the line 15—15 of FIG. 14.

While the pneumatic force measuring system of FIGS. 1 to 13, with one comparative readout meter 32, and with or without the pressure differential gauge 460 has been found to be very sensitive and highly satisfactory for brake testing purposes, other acceptable systems are also contemplated. FIGS. 14 and 15 show in diagrammatic form a brake testing arrangement incorporating a closed hydraulic system for measuring brake force application through the reaction torque of the electric motors 20 and 22.

Referring to FIG. 14, the rolls 94, 96, 102 and 106, and the motors 20 and 22 are identical to those previously described. Attached to the motors 20 and 22 in FIG. 14 are torque arms 462 and 464, respectively, the torque arm 464 being shown in detail in FIG. 15.

The torque arm 464 includes a wide end portion 466 secured to the housing of the motor 22 by bolts 468, and an extending arm portion 470, which is connected to a hydraulic actuator 472 comprising lower and upper cup-shaped housing sections 474 and 476, respectively. The housing sections 474 and 476 have confronting flanges 478 and 480 thereon, respectively, and the margin of a convoluted, rolling diaphragm 482 is clamped therebetween by bolts 484 extending through the flanges 478 and 480.

The bottom wall of the lower housing section 474 has a centrally positioned boss 475 with an opening 486. A bolt 488 extends through the opening 486, and the head thereof is welded to the boss 475. The bolt 486 extends through an opening 490 in a mounting plate 492, similar to the mounting plate 150 in FIGS. 1 and 3, to secure the actuator 472 thereto.

The diaphragm 482 is connected with a piston assembly 494, comprising a disc 496, and a cup-shaped retainer 498 having a cylindrical wall 500 functioning to support the inner wall of the convolution of the diaphragm 482. A headed push rod 502 passes upwardly through the disc 496, the diaphragm 482, and the retainer 498, and a nut 504 is threaded thereon to clamp these parts together. The top wall of the upper housing section 476 has an opening 506 through which the push rod 502 extends. A tare weight 508 is mounted on the push rod 502, and the upper end of said push rod has a connector 510 thereon identical with the connector 428. A bolt 512 extends through a horizontal slot 514 in the arm portion 470, and pivotally secures the connector 510 to the torque arm 464.

The other torque arm 462 is connected to a hydraulic actuator 516 identical to the actuator 472, and both of said actuators function to transmit a signal to a gauge or meter 518 identical to the meter 32 and having a pair of coaxial pointers 520 and 522.

The lower housing section 474 of the hydraulic actuator 472 contains a pressure chamber, and has connected thereto a pressure signal line 524, which is filled from a source of hydraulic fluid supplied through a line 526 having a normally closed valve 528 therein. The pressure line 524 has a pressure control valve 530 positioned therein downstream of the juncture of the lines 524 and 526, the valve 530 corresponding to the valve 380. The pressure line 524 extends to the meter 518, and provides constant communication between the actuating mechanism for the pointer 522 and the pressure chamber of the hydraulic actuator 472. A pressure signal line 532, FIG. 14, extends from the pressure chamber of the hydraulic actuator 516 to the pressure-responsive mechanism for operating the pointer 520, and has a pressure control valve 534 therein corresponding to the valve 376. The pressure line 532 is initially supplied with operating fluid through a line 536 having a normally closed valve 538 therein. A differential pressure gauge 540, corresponding to the gauge 460, is connected between the pressure lines 524 and 532 in advance of the meter 522. It will be understood that the pressure signal lines 524 and 532 are of substantially the same size and length, and that all air is bled therefrom as the separate hydraulic systems, actuators 472 and 516, are filled with oil supplied by the lines 526 and 536.

In operation, the hydraulic apparatus of FIGS. 14 and 15 functions similarly to the pneumatic apparatus of FIGS. 1 to 13. The lines 524 and 532 and the pressure chambers of the actuators 472 and 516 are completely filled with hydraulic fluid for actuating the respective pointers 520 and 522. As the motors 20 and 22 are operated to apply driving torque to a pair of wheels resting on the pairs of rolls 10 and 12, the brake reaction forces generated when the wheel brakes are applied are transmitted by the torque arms 462 and 464 to the hydraulic actuators 472 and 516, respectively. Movement of the torque arms 462 and 464 causes the push rods 502 and diaphragms 482 of their associated hydraulic actuators to move, thus effecting changes in the volume of the pressure chambers of the actuators 472 and 516 that result in pressure changes within the closed hydraulic lines 524 and 532. Such pressure changes are registered instantly and directly on the meter 518, in a manner similar to that in which the brake effort is indicated on the pneumatically actuated meter 32.

Electrical means can also be employed to measure the brake effort through the reaction torque of the electric motors 20 and 22 or reflected by amperage demand, and to register the same on an instrument or meter equipped with dual indicator means for ready observation and comparison of the braking forces on a pair of wheel brakes being tested. An embodiment of the invention showing one such electrical brake testing system is shown in FIGS. 16 to 18.

Figures 16, 17, 18:
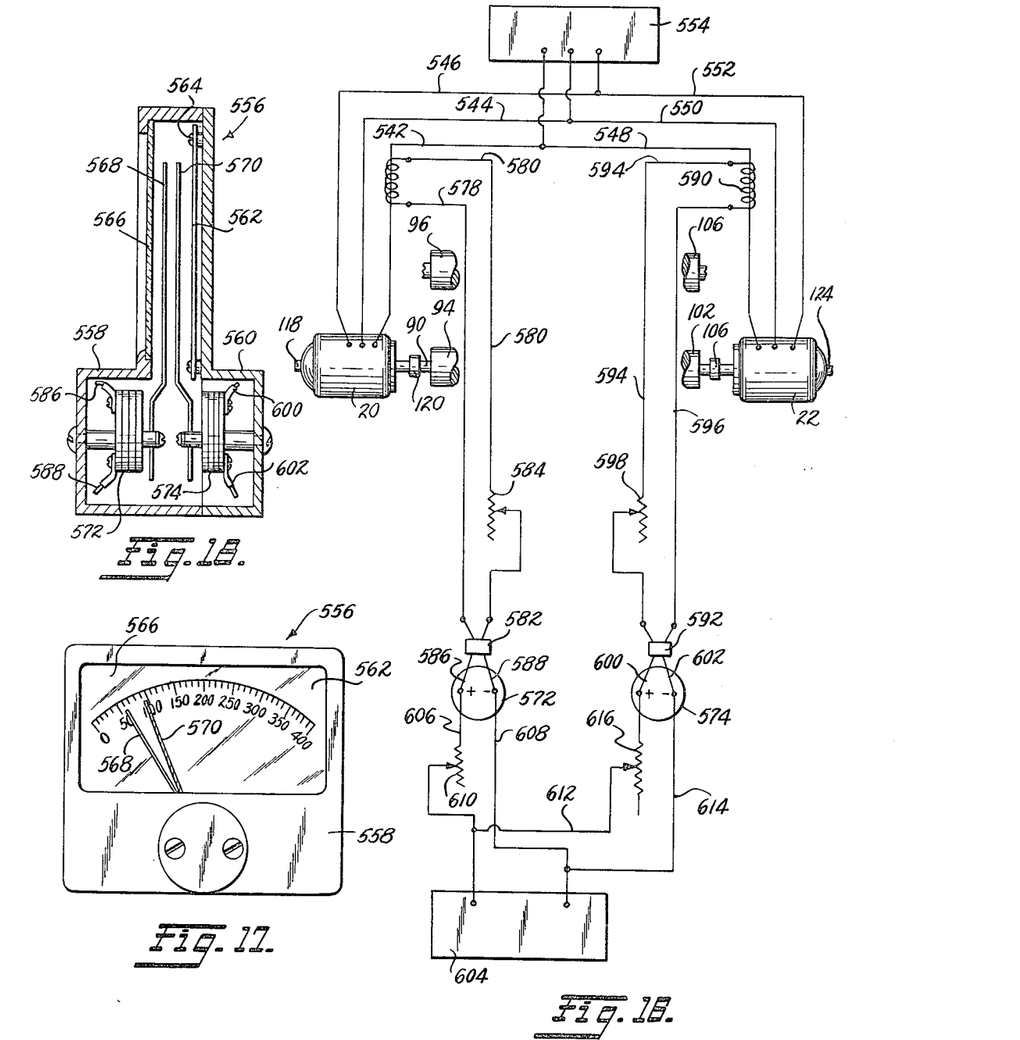
FIG. 16 is a schematic layout and wiring diagram of another form of brake testing apparatus embodying the principles of the invention.
FIG. 17 is a front elevational view of an electrical, dual indicator instrument embodied in the apparatus of FIG. 16.
FIG. 18 is an enlarged vertical sectional view through the indicator instrument of FIG. 17.

Referring to FIG. 16, the motors 20 and 22 are supplied with electricity by leads 542, 544 and 546, and 548, 550 and 552, respectively, from a common three phase, A.C. power supply 554. A dual meter 556 for registering the reaction torques is shown in detail in FIGS. 17 and 18, and comprises a housing including a front section 558 and a rear section 560. A calibrated scale with a range of 0 to 400 pounds brake effort is mounted by screws 564 to the front of the rear section 560, and the front section 558 has a viewing window 566 for observing said dial. A pair of pointers 568 and 570 is arranged to move from "0" (zero) across the scale 562 about a common axis, each pointer having a meter movement 572 and 574, respectively, connected thereto for operating the same. The pointers 568 and 570 are associated with the motors 20 and 22, respectively, and like the pointers 36 and 38 are of different colors, i.e., black and red.

A current transformer 576 is associated with the lead 542 to the motor 20, and is connected by a pair of leads 578 and 580 to a rectifier 582 for the meter movement 572. A range potentiometer 584 is connected in the lead 580, and leads 586 and 588 connect the rectifier 582 to the terminals on the meter movement 572.

Similarly, a current transformer 590 is associated with the lead 548 leading to the motor 22 and is connected to a rectifier 592 by leads 594 and 596, the former having a potentiometer 598 therein. The terminals of the meter movement 574 are connected by leads 600 and 602 to the rectifier 592.

When the motors 20 and 22 are energized to drive a pair of wheels, the current transformers 576 and 590 will supply a signal voltage to the meter movements 572 and 574 proportional to the amperage being drawn through the leads 542 and 548, respectively, supplying current to the motors. Since it is desirable to have the pointers 568 and 570 initially adjusted to zero when the motors 20 and 22 are driving a pair of wheels on which the brakes have not yet been applied, a regulated D.C. power supply 604 is employed to provide a voltage to the meter movements 572 and 574 for cancelling out the "no load" amperage of the motors 20 and 22. A pair of leads 606 and 608 connect the power supply 604 to the terminals on the meter movement 572, the lead 606 having a potentiometer 610 therein. Similarly, leads 612 and 614 connect the power supply 604 to the meter movement 574, the lead 612 having a potentiometer 616 therein. By adjusting the potentiometers 610 and 616 while the motors 20 and 22 are revolving under "no brake load" condition, the pointers 568 and 570 can both be adjusted to zero. Subsequent deflection of the pointers 568 and 570 will then be a measure of the current required to meet the torque loads on the motors 20 and 22 imposed by the brakes being tested, expressed in pounds of brake effort.

The apparatus shown in FIGS. 16 to 18 functions in a manner analogous to the apparatus of FIGS. 1 to 13, and 14 and 15 for indicating reaction torques, and hence the value of the brake effort. Again, any unbalance between the wheel brakes being tested will be indicated by the extent of non-registry of the coaxial, simultaneously observable points 568 and 570.

In all embodiments of the present invention, the separate reaction torques of a pair of electric motors arranged to drive a pair of wheels are measured while the wheel brakes are being applied, and the results are indicated as brake effort on one readout instrument embodying dual indicator means that can be observed simultaneously by the eyes of the operator focused upon a single object, each indicator means constituting part of a system for testing one wheel brake. The use of dual indicator means makes it possible for an operator to observe at a single glance the momentary or transient braking force of each brake on a pair of wheels, and to make a ready comparison of the performance of the brakes on the two wheels to determine any unbalance or other malfunction that might be present.

An oscilloscope could be used in the system of FIG. 16 in lieu of the meter to show two closely adjacent vertical or two horizontal bars whose length, when the tester is in use, would be directly proportional to the brake force acting on each wheel.

Further modifications and variations of the present invention are obviously possible. Accordingly, it is to be understood that within the scope of the following claims the invention may be practiced otherwise than as specifically described.

I claim:

1. Brake testing apparatus for a plurality of rotatable members each having a brake, comprising: separate torque applying units, one for applying driving torque load to each of said rotatable members to rotate the same while its brake is being applied, said torque applying units including an electric motor; means for independently indicating the driving torque being absorbed by the brake on each of said rotatable elements, including a single instrument having indicator elements, one of said indicator elements being associated with each of said torque applying units, said indicator elements having a given starting value and being operable to simultaneously indicate the particular value of the driving torque being absorbed by the respective brakes; and means between each of said torque applying units and its associated indicator element operable to effect actuation of said indicator elements in accordance with the value of a fluid pressure signal produced by the reaction torque of the electric motors, each signal having a value proportional to the reaction of its associated electric motor, said last-mentioned means including control means for preventing overshoot or under-shoot of said indicator elements whereby any unbalance in the separate braking forces acting upon said rotatable members will be shown on said single instrument by the difference in the values indicated by said indicator elements.

2. Vehicle brake testing apparatus, comprising: two pairs of longitudinally aligned rolls, each pair being engageable by a wheel of a vehicle whose brake is to be tested, a separate electric motor connected with one roll of each of said pairs of rolls for applying a driving torque load to said one roll to rotate a vehicle wheel when in contact therewith and while the brake of the wheel is applying a braking force thereto; means cradling the motors for pivotal movement in response to torque reaction; means for independently indicating the driving torque load being absorbed by the brake on each of said wheels, including a single scale and two independent fluid pressure operable indicator elements having the same starting value on said scale and being rotatable about a common axis relative to said scale; and a torque arm connected with each of the motors and movable therewith to effect actuation of said indicator elements in accordance with the value of the driving torque reactions of the separate torque loads being applied to said wheels and absorbed by said brakes, and means actuated by movement of said torque arms and connected with said indicator elements for varying the application of pressure to said indicator elements in accordance with movements of said torque arms resulting from variations in driving torque loads, said last-mentioned means including control means for preventing over-shoot or under-shoot of said indicator elements, whereby any unbalance in the braking forces acting upon said wheels will be indicated on said scale by the value represented by the difference in values indicated by the angular disposition of said indicator elements relative to each other.

3. Vehicle brake testing apparatus, comprising: two pairs of longitudinally spaced, aligned rolls for engaging a pair of vehicle wheels whose brakes are to be tested; two electric motors, one motor being connected with one roll of each pair of rolls for driving wheels when engaged with said rolls at substantially the same speed while a braking force is being applied to said wheels; means cradling each of said electric motors for oscillating movement about its axis in response to variations in torque reaction thereon; a torque arm connected with each of said electric motors; indicating means having a pair of independent, fluid pressure operable pointers having a common starting point and being rotatable about a common axis for simultaneous observance, one pointer being associated with each motor; and means actuated by the respective torque arms and connected with the respective fluid pressure operable pointers for varying the application of fluid pressure thereto in accordance with the angular movement of said torque arms in response to variations in the torque load being absorbed by the braking forces applied to the vehicle wheels by their wheel brakes, whereby any unbalance existing in said braking forces will be indicated by the relative angular displacement of said simultaneously observable coaxial pointers.

4. Vehicle brake testing apparatus as recited in claim 3, wherein the means actuated by the respective torque arms for varying the application of pressure to the respective fluid pressure operable, coaxial pointers is a hydraulic device having a liquid containing chamber connected with one of the fluid pressure operable pointers, and wherein means connected with the torque arm applies pressure to the liquid in said chamber in accordance with the angular movement of the torque arm.

5. Vehicle brake testing apparatus as recited in claim 3, wherein the means actuated by the respective torque arms for varying the application of pressure to the respective fluid pressure operated coaxial pointers is a pneumatic unit connected with each pointer and with a source of air under pressure and having a valve controlling the pressure to said coaxial pointers, and which valve is actuated by the torque arms to vary the pressure effective upon said pointers in accordance with the angular movement of the respective torque arms.

6. Vehicle brake testing apparatus as recited in claim 5, including a dash pot connected to each torque arm for dampening the movement thereof and thereby preventing over-shoot or under-shoot of said pneumatic units.

7. Vehicle brake testing apparatus as recited in claim 5, wherein each pneumatic unit includes a body having an inlet normally connected with a source of air under pressure, a pressure chamber, an outlet communicating with said pressure chamber and also connected with the associated fluid pressure operable indicator pointer, and valve means controlling the venting of air from said pressure chamber to the atmosphere, and also controlling the admission of air from said inlet into said pressure chamber, and means connecting said valve means with its associated torque arm for effecting actuation of said valve means in accordance with the angular movement of said torque arm.

8. Vehicle brake testing apparatus, comprising: two pairs of longitudinally spaced, aligned rolls for engaging a pair of vehicle wheels whose brakes are to be tested; two electric motors, one motor being connected with one roll of one pair of rolls and the other motor being connected with one roll of the other pair of rolls for driving said wheels at substantially the same speed while the brakes thereof are applying a braking force; means cradling each of said electric motors for pivotal movement of the motor housing in response to torque reaction; a torque arm connected with the housing of each of said electric motors; plural indicating means having independent, fluid pressure operable indicating elements having a common no load point; and means actuated by the respective torque arms and connected with the respective fluid pressure operable indicating elements for varying the application of fluid pressure thereto in response to variations in the torque load being absorbed by the braking force being applied to the vehicle wheels by the wheel brakes, whereby any unbalance existing in said braking forces applied to said vehicle wheels will be indicated by the extent of displacement of said indicating elements relative to each other.

9. Vehicle brake testing apparatus as recited in claim 8, wherein the dual indicating means is a pressure gauge and the indicating elements are coaxially arranged pointers actuated by separate fluid pressure responsive Bourdon tubes.

10. Vehicle brake testing apparatus as recited in claim 8, including a dash pot connected with each torque arm to dampen the movement thereof.

11. Vehicle brake testing apparatus as recited in claim 8, wherein the means actuated by the respective torque arms for varying the application of pressure to the respective fluid pressure operated, coaxial pointers is a sensitive pneumatic pressure regulating unit connected with the Bourdon tube of each pointer and with a source of air under pressure, and which is actuated by the torque arms to control the pressure effective upon said pointers in accordance with the angular movement of the respective torque arms.

12. Vehicle brake testing apparatus as recited in claim 11, wherein each pneumatic pressure regulating unit includes a body having an inlet to be connected with a source of air under pressure, a pressure chamber, an outlet communicating with said pressure chamber and connected with the fluid pressure responsive Bourdon tube of a pointer, and valve means controlling the venting of air from said pressure chamber to the atmosphere, and also controlling the admission of air from said inlet into said pressure chamber, and means connecting said valve means with a torque arm for effecting actuation of said valve means in accordance with the angular movement of the torque arm.

References Cited

UNITED STATES PATENTS

| | | | |
|---|---|---|---|
| 2,347,497 | 4/1944 | Neiswinter et al. | 324—125 X |
| 2,804,093 | 8/1957 | Scherer | 73—392 X |
| 1,785,243 | 12/1930 | Bewley | 73—126 |
| 1,838,414 | 12/1931 | Langhein | 73—126 |
| 1,920,263 | 8/1933 | Langhein | 73—126 |
| 1,873,051 | 8/1932 | Semmer | 73—126 |
| 2,623,385 | 12/1952 | Jamieson | 73—136 |
| 2,931,638 | 4/1960 | Weber | 73—141 X |
| 3,238,771 | 3/1966 | Myrtetus | 173—117 |
| 3,286,517 | 11/1966 | Ostrander | 73—136 X |
| 3,312,104 | 4/1967 | Hegenbart | 73—123 |

JERRY W. MYRACLE, Primary Examiner

U.S. Cl. X.R.

73—407